United States Patent [19]

Stroud

[11] Patent Number: 5,263,303
[45] Date of Patent: Nov. 23, 1993

[54] LAWN EDGER USING FLEXIBLE FILAMENT CUTTING LINE

[76] Inventor: Dudley R. Stroud, Rte. 1, Box 399-A91, Springhill, La. 71075

[21] Appl. No.: 868,839

[22] Filed: Apr. 16, 1992

[51] Int. Cl.[5] .................. A01D 34/47; A01D 34/54; A01D 34/58; A01D 34/84
[52] U.S. Cl. .................. 56/12.7; 56/17.2; 56/320.1; 56/DIG. 18; 56/DIG. 24; 56/17.4; 56/17.5
[58] Field of Search .............. 56/12.7, 17.2, DIG. 18, 56/17.5, 17.4, 320.1, 2, 322; 172/15, 17, 42; 30/276, 296.1, DIG. 5

[56] References Cited

U.S. PATENT DOCUMENTS

| | | | |
|---|---|---|---|
| 2,663,137 | 12/1953 | Asbury | 56/295 |
| 2,697,457 | 12/1954 | Lawrence | 30/264 X |
| 2,718,742 | 9/1955 | Tangeman | 56/17.4 |
| 2,832,184 | 4/1958 | Beverle | 56/17.2 |
| 3,977,078 | 8/1976 | Pittinger, Jr. | 56/12.7 X |
| 4,033,098 | 7/1977 | Green | 56/295 |
| 4,077,191 | 3/1978 | Pittinger, Sr et al. | 56/12.7 |
| 4,364,435 | 12/1982 | Tuggle et al. | 56/17.2 X |
| 4,712,363 | 12/1987 | Claborn | 56/12.7 |
| 5,029,435 | 7/1991 | Buchanan | 172/17 X |
| 5,077,898 | 1/1992 | Hartwig | 56/12.7 X |
| 5,095,687 | 3/1992 | Andrew et al. | 56/12.7 |

*Primary Examiner*—Stephen J. Novosad
*Attorney, Agent, or Firm*—Richard C. Litman

[57] ABSTRACT

A powered lawn edging or trimming tool is provided with at least one flexible filament cutting line, rather than the usual rigid metal blade. The use of a filament type cutting element precludes many of the disadvantages of such tools using rigid blades, such as the need to sharpen blades regularly and the relative hazard of such rapidly rotating rigid blades. The flexible elements also reduce the number and size of foreign objects (gravel, etc.) thrown about by the tool in operation. A method of modifying a standard grass trimmer having a horizontally disposed cutting head to form the tool of the present invention, is also disclosed.

8 Claims, 2 Drawing Sheets

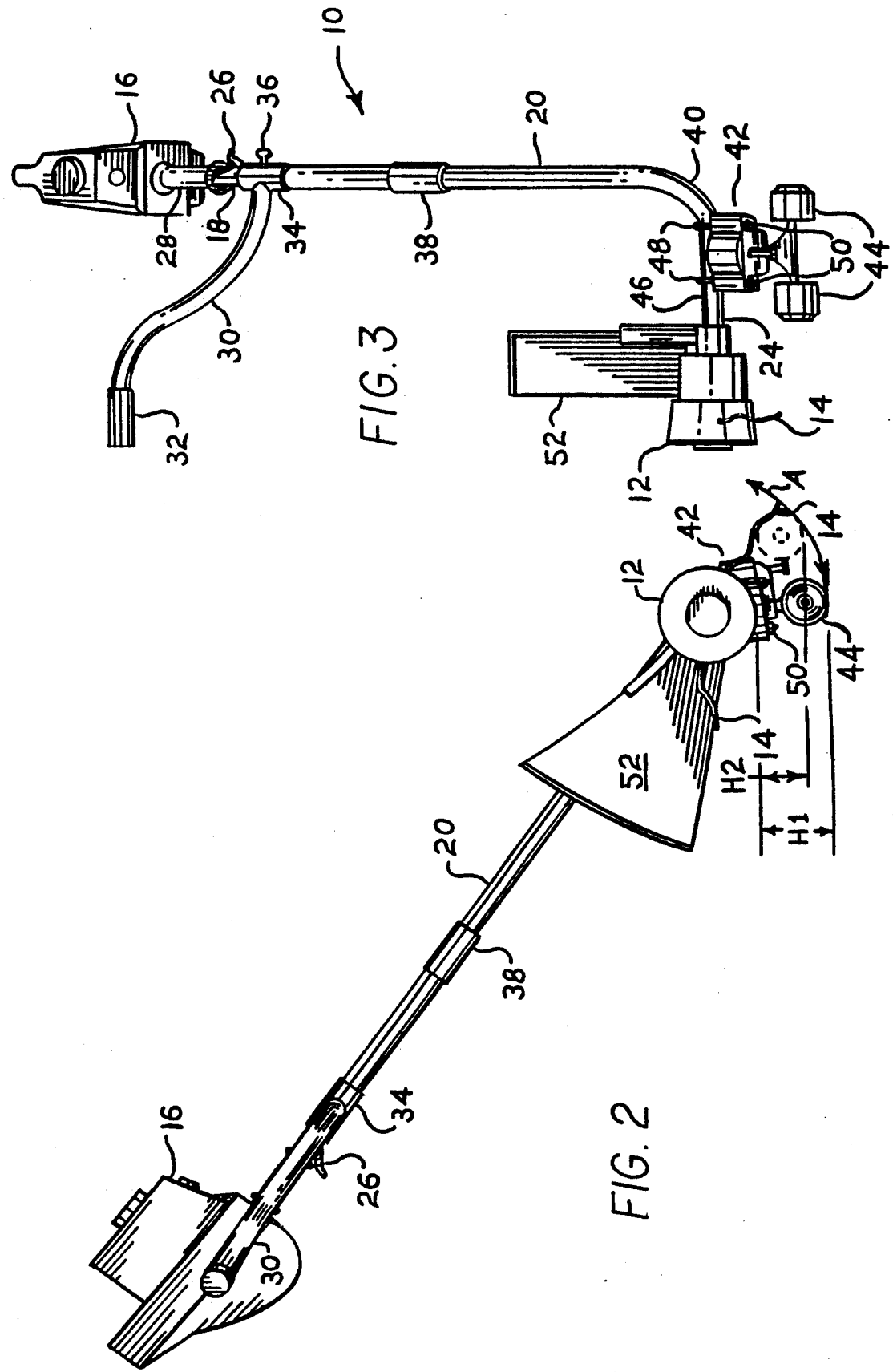

LAWN EDGER USING FLEXIBLE FILAMENT CUTTING LINE

FIELD OF THE INVENTION

This invention relates generally to powered tools for vertically trimming the peripheries of grassy areas and lawns, and more specifically to such a tool using a flexible filament cutting line to replace the cutting or edging blade.

BACKGROUND OF THE INVENTION

Residential, commercial and public areas are increasingly found with a mixture of closely trimmed grassy areas and lawns, surrounded or bordered by concrete or other surfaces. Generally, When the grassy periphery is allowed to grow up along and over such other surfaces, the result is considered unsightly. However, lawn mowers and the like cannot generally trim such grassy peripheries to the extent desired in most cases.

As a result many tools and machines, both powered and manually operated, have been developed for such lawn edging or peripheral trimming of mowed grassy areas. However, most of these machines or tools include various drawbacks due to their weight, lack of power assistance, and/or the potential hazards associated With a rapidly spinning rigid cutting blade. Moreover these rigid cutting blades require sharpening from time to time, which additional task adds to the time required for the job and reduces overall efficiency.

The need arises for a lawn edging tool or the like which uses a flexible filament cutting element in order to reduce the hazard otherwise associated with such tools. The tool should provide other advantages of economical manufacture and light weight by means of use of existing components where possible, and also provide for relatively low maintenance.

DESCRIPTION OF THE RELATED ART

U.S. Pat. No. 2,663,137 issued to C. T. Asbury on Dec. 22, 1953 discloses a Lawn Edger using a plurality of twisted wire cutting elements. The rigid attachment of the wire cutting elements to the hub, in combination with the rigidity of the wire elements themselves, results in a tool including most, if not all, of the hazards associated with a standard bladed tool of the same class. Such rigid cutting elements may tend to cut relatively deeply into the turf, severing the root structure of the grass or other plantings, and also are known to pick up small stones and project them at high velocity, creating further hazard. Moreover, the device itself is relatively heavy and bulky, precluding easy carriage by the user.

U.S. Pat. No. 2,697,457 issued to B. F. Lawrence on Dec. 21, 1954 discloses a Manually Portable Brush Cutting Power Tool. While one embodiment of the device includes wheels, they are oriented to provide a generally horizontal cutting plane for the blade; no provision is made for a vertical cutting plane, as needed in the case of lawn edgers and the like. Moreover, the device uses a rigid blade, with its inherent drawbacks as discussed above and the need for at least occasional sharpening.

U.S. Pat. No. 2,718,742 issued to W. H. Tangeman on Sep. 27, 1955 discloses a Lawn Edger using centrifugal bladed cutting elements. Most, if not all, of the disadvantages noted in the patents to Asbury and Lawrence discussed above are found in this device also.

U.S. Pat. No. 2,832,184 issued to J. H. Beuerle on Apr. 29, 1958 discloses a Lawn Edger And Trimmer which device is capable of use in either the horizontal or vertical planes for trimming or edging. The guard for the cutting blade also serves as the wheel or roller for the device when it is used as an edger. However, the rigid blade still results in the problems noted above.

U.S. Pat. No. 4,033,098 issued to Garry J. Green on Jul. 5, 1977 discloses a Grass Trimming Apparatus similar in structure to a garden tiller or similar device. The relatively large size, bulk and weight preclude use in the manner of a filament or string trimmer, although the device does make use of a string or filament element as a cutting tool. However, no means is provided for operation of the device with the cutting element in a vertical plane, as is required for edging operations. In fact, the power source disclosed in the patent would be incapable of operation when the device is turned significantly from the horizontal.

U.S. Pat. No. 4,077,191 issued to C. B. Pittinger, Sr. et al. on Mar. 7, 1978 discloses a Filament Trimmer/Mower having a structure closely related to a standard household lawn mower. While the device does use a filament cutting element, no means is disclosed for operation of the cutting element in the vertical plane, even though the electric motor disclosed would permit such operation.

U.S. Pat. No. 4,364,435 issued to L. H. Tuggle et al. on Dec. 21, 1982 discloses a Lawn Edger which again makes use of a rigid blade, and thereby includes the various disadvantages associated with such rigid cutting elements discussed above. Moreover, while the device appears to make use of various components such as may be used in string or filament trimmers and the like, the cutting head itself is relatively complex, costly and heavy when compared to that of the present invention.

None of the above noted patents, either singly or in combination, are seen to disclose the specific arrangement of concepts disclosed by the present invention.

SUMMARY OF THE INVENTION

By the present invention, an improved tool for use in trimming or edging lawns, grassy areas and the like is disclosed.

Accordingly, one of the objects of the present invention is to provide an improved lawn edging tool which makes use of one or more string or filament type cutting elements.

Another of the objects of the present invention is to provide an improved lawn edging tool which may be readily constructed from existing components with a minimum of modification, thereby permitting production of the device at a minimum cost.

Yet another of the objects of the present invention is to provide an improved lawn edging tool which includes a power source.

Still another of the objects of the present invention is to provide an improved lawn edging tool which is relatively light weight and thus may be easily carried by the operator or other person between points of use.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

FIG. 2 is a side view of the present invention, showing various details.

FIG. 3 is a front view of the present invention, showing further details.

Similar reference characters designate corresponding parts throughout the several figures of the drawings.

DESCRIPTION OF THE PREFERRED EMBODIMENT

Figure 1:
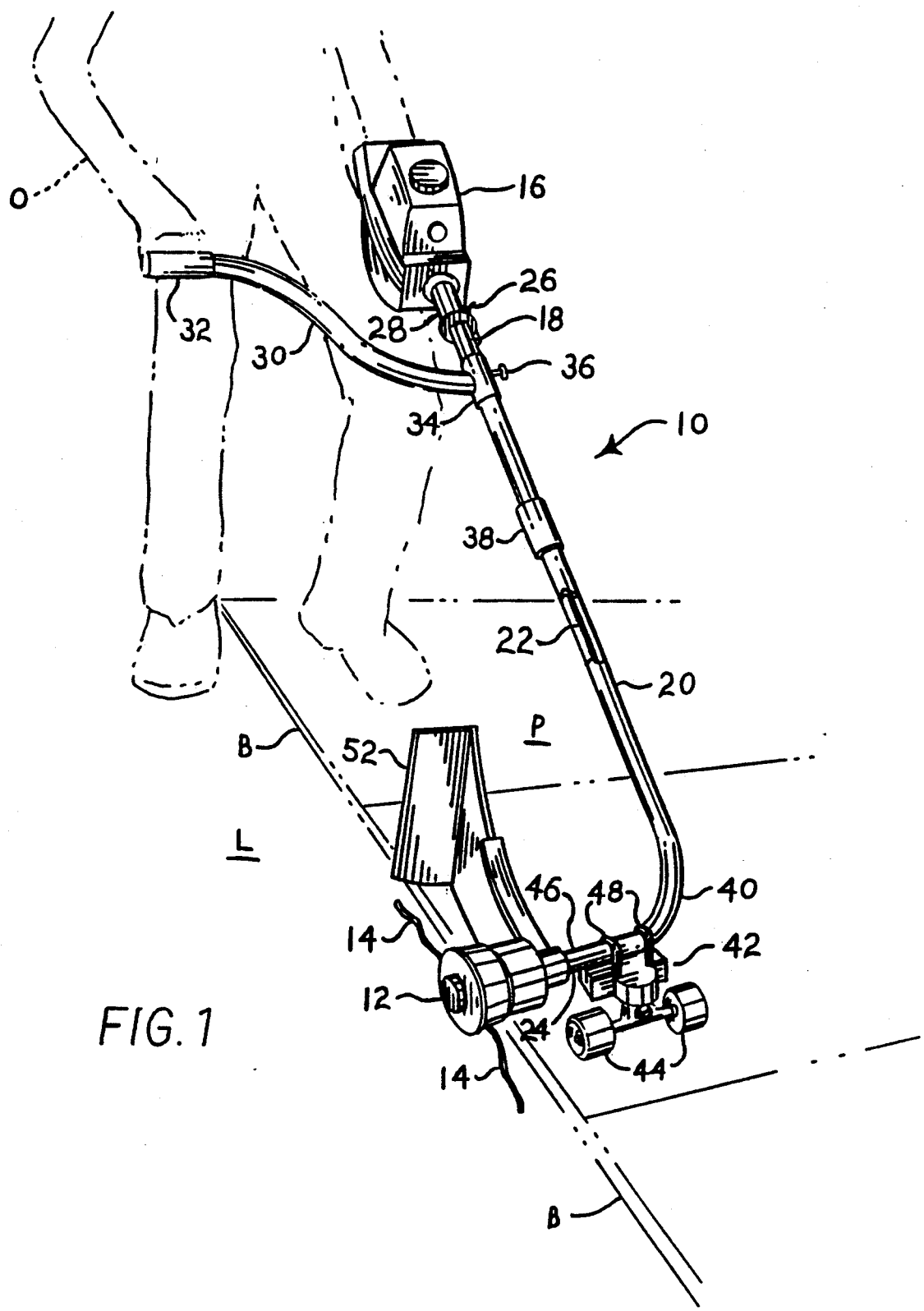
FIG. 1 is a perspective view of the present invention in use, showing its various features.

Referring now to the drawings, particularly FIG. 1 of the drawings, the present invention will be seen to relate to a powered lawn edging tool 10 having a trimming head or element 12 which is oriented in a generally vertical plane and using one or more flexible filament cutting lines 14. Trimming head 12 may be of the "bump feed" type or other filament advance means may be used. Tool 10 is powered by a power source 16, Which power source 16 may be a small, lightweight gasoline engine or alternatively electric power may be used.

Power source 16 is secured to a first end 18 of a hollow tubular drive shaft housing 20, which housing 20 contains a flexible drive shaft 22. Drive shaft 22 extends from power source 16 completely through the axial center of drive shaft housing 20, to supply power to cutting head 12 Which is attached to but free to rotate relative to the second end 24 of drive shaft housing 20. Thus, power source 16 provides rotational power to drive cutting lines 14 by means of cutting head 12 being driven by flexible drive shaft 22. Control of the power output of power source 16 is provided by means of a throttle trigger or control 26 located on hand grip 28, which grip 28 is located on the first end 18 of drive shaft housing 20 adjacent power source 16.

A generally lateral handlebar 30 having a distal handlebar grip 32 is secured to drive shaft housing 20 adjacent handle grip 28, to provide additional control of tool 10. It will be understood that the heaviest component of tool 10 is power source 16, and positioning handle grip 28 and handlebar 30 near power source 16 positions those components 28 and 30 very near the center of gravity of tool 10. This is advantageous to the operator O of tool 10, as no additional effort must be made to overcome any imbalance of tool 10. Lateral handlebar 30 is secured to drive shaft housing 20 by means of a collar 34 and set screw 36, thereby providing for adjustment of the position of lateral handlebar 30 as desired. Obviously, other adjustment means may be provided. Additionally, a medial hand grip 38 is provided at the approximate medial point of drive shaft housing 20.

Drive shaft housing 20 will be seen to have a curved portion 40 near the second end 24. Drive shaft housing curved portion 40 permits the second end 24 of drive shaft 20 to be essentially horizontal while tool 10 is in use, thus providing cutting head 12 and cutting lines 14 with a vertical plane of rotation. A wheel or roller assembly 42 including one or more wheels or rollers 44 is secured to the horizontal portion 46 of drive shaft housing 20, near second end 24. The roller securing means may comprise U-bolts 48 and cooperating nuts 50 (FIGS. 2 and 3), or alternative roller attachment means may be provided. Finally, a guard 52 is attached to second end 24 of drive shaft housing 20 and disposed between cutting lines 14 and the operator O of tool 10, in order to protect the operator O from any objects which may be thrown about by cutting lines 14 as tool 10 is in operation.

The foregoing discussion includes a description of many components which will be seen to be similar to those used in flexible line type vegetation trimmers. In fact, one means of constructing the present invention is by modifying an existing flexible line trimmer. Such trimmers will generally be constructed with the cutting head disposed in a horizontal plane and having a driveshaft housing including a curved portion. As the drive shaft housings of such devices are almost universally formed of a generally cylindrical tubular material, the various components assembled thereto may be repositioned as desired by loosening the appropriate clamping attachments, reorienting the components as desired, and tightening the clamps.

In the case of the present invention, power source 16 has been repositioned 90 degrees to its original orientation in order to provide for upright operation of power source 16 when driveshaft housing 20 is turned 90 degrees to provide for operation of cutting head 12 in a vertical plane. (This step will be seen to be unnecessary in the event an electric power source is used.) Hand grip 28, along with control 26, may also be turned 90 degrees for optimum efficiency. Similarly, lateral handlebar 30 has been repositioned by means of set screw 36 and collar 34. Finally, a wheel or roller assembly 42 has been added to the resulting horizontal portion 46 of drive shaft housing 20 to produce the tool 10 of the present invention.

Tool 10 may be used to accurately trim the grass or other vegetation along the border B between a lawn or planted area L and adjacent paved or other area P. Power source 16 is activated and tool 10 is picked up and held in the manner shown in FIG. 1, with roller assembly 42 resting on paved area P adjacent to border B and the operator O controlling the power output of power source 16 by means of control 26. Tool 10 may then be used in the manner of other related power tools, by advancing along the border B intended to be trimmed and allowing the rapidly spinning cutting lines 14 to produce a neat, vertical trim line along border B.

In some cases it will be found that cutting head 12, and therefore cutting lines 14, are too low or too high relative to the edge being trimmed due to the relative height of the adjacent paved area P. Tool 10 may be adjusted to compensate for this as needed, by loosening nuts 50 on U-bolts 48 of roller assembly 42, and rotating roller assembly 42 about the horizontal portion 46 of drive shaft housing 20 as desired. A clearer view of such adjustment is shown in FIG. 2, by adjustment arc A. As can be seen, when roller assembly 42 is swung arcuately forward (as in this case), the height H2 of the bottom of cutting head 12 relative to wheels or rollers 44, will be less than the height H1 when roller assembly 42 is adjusted to achieve the maximum height. While the height adjustment means described above is adequate for the tool 10 of the present invention, obviously other means for the adjustment of cutting height may be provided.

It is to be understood that the present invention is not limited to the sole embodiment described above, but encompasses an and all embodiments within the scope of the following claims.

I claim:

1. A portable, powered tool for use by an operator in the trimming of the edges of lawns and other planted areas, said tool comprising:
   a hollow, generally cylindrical drive shaft housing having a first end and a second end,
   a power source attached to said first end of said drive shaft housing and driving a drive shaft disposed within said drive shaft housing,
   a cutting head attached to said second end of said drive shaft housing and free to rotate thereupon,
   said cutting head being driven by said drive shaft and including at least one flexible filament cutting line,
   said drive shaft housing including a curved portion providing a generally horizontal drive shaft housing portion adjacent said second end of said drive shaft housing and thereby providing a generally vertical plane of rotation for said cutting head,
   a roller assembly including at least one roller,
   said roller assembly being attached to said generally horizontal drive shaft housing portion of said drive shaft housing and supporting said drive shaft housing and said cutting head at a selected height of said planted areas, and
   means for adjusting said selected height above said planted areas, by arcuately repositioning said roller assembly on said generally horizontal drive shaft housing portion of said drive shaft housing, whereby
   said power source of said tool is actuated and said tool is rolled along said edges of said planted areas by said operator through said roller assembly, said cutting head and said cutting line being oriented in said vertical plane of rotation to provide said trimming of said edges of said planted areas.

2. The tool of claim 1 wherein:
   said power source is an internal combustion engine.

3. The tool of claim 1 wherein:
   said power source is an electric motor.

4. The tool of claim 1 including:
   adjustable lateral handle bar means.

5. The tool of claim 1 including:
   guard means disposed in a vertical plane between said operator and said cutting line vertical plane of rotation.

6. The tool of claim 1, said means for adjusting said selected height comprising at least one U-bolt surrounding said generally horizontal drive shaft housing portion, said U-bolts having threaded ends passing through bores in said roller assembly, and nuts threaded on said threaded ends of said U-bolts; whereby said height adjustment is achieved by loosening said threaded nuts and rotating said roller assembly about said generally horizontal drive shaft housing portion, and thereafter tightening said nuts.

7. A method of constructing a portable, powered tool for use by an operator in the trimming of the edges and other planted areas, said tool constructed from a vegetation trimmer including a hollow, generally cylindrical drive shaft housing having a first end and a second end, a power source having an upright position attached to said first end of said drive shaft housing, and driving a drive shaft disposed within said drive shaft housing, a cutting head attached to said second end of said drive shaft housing and free to rotate thereupon, said cutting head being driven by said drive shaft and including at least one flexible filament cutting line, said drive shaft housing including a curved portion providing a generally horizontal drive shaft housing portion adjacent said second end of said drive shaft housing and thereby providing a generally horizontal plane of rotation for said cutting, the method comprising;
   reorienting said tool so that said cutting head plane of rotation is vertical and said drive shaft housing potion adjacent said second end of said drive shaft lies in a horizontal plane;
   radially repositioning said power source upon said drive shaft housing first end to enable said upright position to be achieved;
   providing a roller assembly for adjustable attachment to said tool; and
   attaching said roller assembly to said drive shaft housing portion adjacent to said drive shaft second end for arcuate adjustment about said drive shaft housing second end;
   thereby adjustably supporting said drive shaft housing portion adjacent said drive shaft second end, and providing said cutting head and said cutting line with a vertical plane of rotation to provide a tool for trimming said edges of said planted areas, said adjustable attachment enabling said tool to be vertically adjusted above said planted areas.

8. The method of claim 7, said adjustable attachment comprising the provision of at least one U-bolt surrounding said generally horizontal drive shaft housing portion, said at least one U-bolt having threaded ends passed through bores in said roller assembly, said threaded ends receiving nuts thereon, said tool being vertically adjusted by loosening said nuts and rotating said roller assembly about said generally horizontal drive shaft housing portion.

* * * * *